United States Patent
Seah

(10) Patent No.: US 7,605,688 B1
(45) Date of Patent: Oct. 20, 2009

(54) VEHICLE LOCATION DETERMINATION SYSTEM USING AN RFID SYSTEM

(75) Inventor: Kirschen A. Seah, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 27 days.

(21) Appl. No.: 11/437,305

(22) Filed: May 19, 2006

(51) Int. Cl.
*B60Q 1/00* (2006.01)
*G01C 21/00* (2006.01)
*G01C 23/00* (2006.01)

(52) U.S. Cl. .............. 340/425.5; 340/945; 340/971; 340/972; 340/572.1

(58) Field of Classification Search .......... 340/425.5, 340/961, 933, 945, 948, 971, 972, 981, 572.1; 701/301; 342/29
See application file for complete search history.

(56) References Cited

U.S. PATENT DOCUMENTS

| | | | | |
|---|---|---|---|---|
| 5,530,440 A | * | 6/1996 | Danzer et al. | 340/933 |
| 6,246,342 B1 | * | 6/2001 | Vandevoorde et al. | 340/961 |
| 6,381,541 B1 | | 4/2002 | Sadler | 701/301 |
| 6,462,697 B1 | * | 10/2002 | Klamer et al. | 342/36 |
| 6,690,295 B1 | | 2/2004 | De Boer | 340/951 |
| 6,927,701 B2 | * | 8/2005 | Schmidt et al. | 340/959 |
| 7,167,095 B2 | * | 1/2007 | Carrender | 340/572.4 |

* cited by examiner

*Primary Examiner*—Toan N Pham
(74) *Attorney, Agent, or Firm*—Daniel M. Barbieri

(57) ABSTRACT

A vehicle location determination system including a radio frequency identification (RFID) interrogator system positioned on a vehicle; and, a plurality of passive RFID tags positioned in an environment proximate to an intended path of the vehicle. The RFID interrogator system provides the capability of having the vehicle determine its location in the proximate environment based on the interrogation of the passive RFID tags. The present invention is particularly adaptable for use in an airport environment. It is not reliant on any type of ground based interrogation system. Instead, the airport surface movement area (i.e. taxiways, runways, ramps and gates) is only required to have a system of passive RFID tags.

20 Claims, 2 Drawing Sheets

VEHICLE LOCATION DETERMINATION SYSTEM USING AN RFID SYSTEM

BACKGROUND OF THE INVENTION

1. Field of the Invention

The present invention relates generally to systems for determining the location of vehicles, and more particularly to a system for determining vehicle locations that utilizes a radio frequency identification (RFID) system. The system is particularly adapted for use in defining the position of an aircraft on an airport surface movement area.

2. Description of the Related Art

Pilots who taxi aircraft especially in large, unfamiliar airports have to rely on signage and airport diagrams to locate the appropriate taxiways, aprons and runways. It would be desirable for a pilot to determine their position on the airport surface.

The FAA defines a runway incursion as "any occurrence in the airport runway environment involving an aircraft, vehicle, person, or object on the ground that creates a collision hazard or results in a loss of required separation with an aircraft taking off, intending to take off, landing, or intending to land." The FAA has identified the reduction in risk of runway incursions as one of the Performance Targets in its Portfolio of Goals for FY 2006. Historical records for the past several years indicate approximately 300 runway incursion incidents per year with pilot deviations accounting for more than half of the total. Many of these incidents are due to pilots' lack of awareness of their position on the airport surface.

RFID tags are normally used to track data relating to objects to which they have been affixed. These tags are often used in the automatic data identification industry, such as inventory control.

U.S. Pat. No. 6,381,541, entitled "Airplane Ground Location Methods and Systems," issued to L. R. Sadler, discloses use of a ground location evaluator that includes one or more interrogators. Individual interrogators are configured to receive wireless communication from multiple airplanes that are located on the ground at an airfield. Multiple location transmitters or transceivers are provided and each is mounted on an airplane. Individual location transmitters or transceivers are configured to wirelessly communicate with the one or more interrogators. The ground location evaluator is configured to process the wireless communication to ascertain the location of communicating airplanes and responsive thereto and determine whether there is a likelihood of a runway incursion.

U.S. Pat. No. 6,690,295, entitled "System For Determining the Position of Vehicles at an Airport," issued to R. G. De Boer, discloses a device for determining the position of an aircraft at an airport, that includes a plurality of sensors for detecting at least one radio signal originating from a vehicle, in which the plurality of sensors are preferably positioned at regular intervals from one another on parts of the airport which are accessible to the vehicle. The present device is preferably used for detecting the position of an aircraft on the runway system of an airport. The sensors are preferably fitted in light positions of runway lighting provided at the airport on taxiways, take-off and landing runways and on platforms. The signal originating from a radio altimeter of an aircraft is preferably used as the radio signal.

SUMMARY OF THE INVENTION

In a broad aspect, the present invention is a vehicle location determination system including a radio frequency identification (RFID) interrogator system positioned on a vehicle; and, a plurality of passive RFID tags positioned in an environment proximate to an intended path of the vehicle. The RFID interrogator system provides the capability of having the vehicle determine its location in the proximate environment based on the interrogation of the passive RFID tags. The present invention is particularly adaptable for use in an airport environment. It is not reliant on any type of ground based interrogation system. Instead, the airport surface movement area (i.e. taxiways, runways, ramps and gates) is only required to have a system of passive RFID tags.

The '541 system noted above appears to be very specifically applied to runway incursion prevention. In that patent, the ground locator evaluators are "active" entities as they have to interrogate the location transceivers and perform processing to ascertain if aircraft equipped with location transceivers are "close" to each other. The location transceivers are "passive" in that they merely respond to the interrogation requests of the ground locator evaluators and perform no processing. The '541 teaching does not involve specifying specific "locations" at an airport. It is directed more toward specifying "blocks" or "slots" of space. The present invention, on the other hand, is not restricted to block based locations in that it can provide much finer grained location determination. The '541 system has a central system locate aircraft to prevent runway incursion conflicts. The present invention, on the other hand, involves having the aircraft determine its location on the airport surface—the particular taxiway, ramp or runway based on interrogating passive RFID tags.

The '295 system discussed above, like the '541 system, includes processing at the ground location rather than the vehicle. The present invention is particularly advantageous in that each aircraft or ground vehicle can autonomously determine its own position without the need for a ground based interrogation system.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
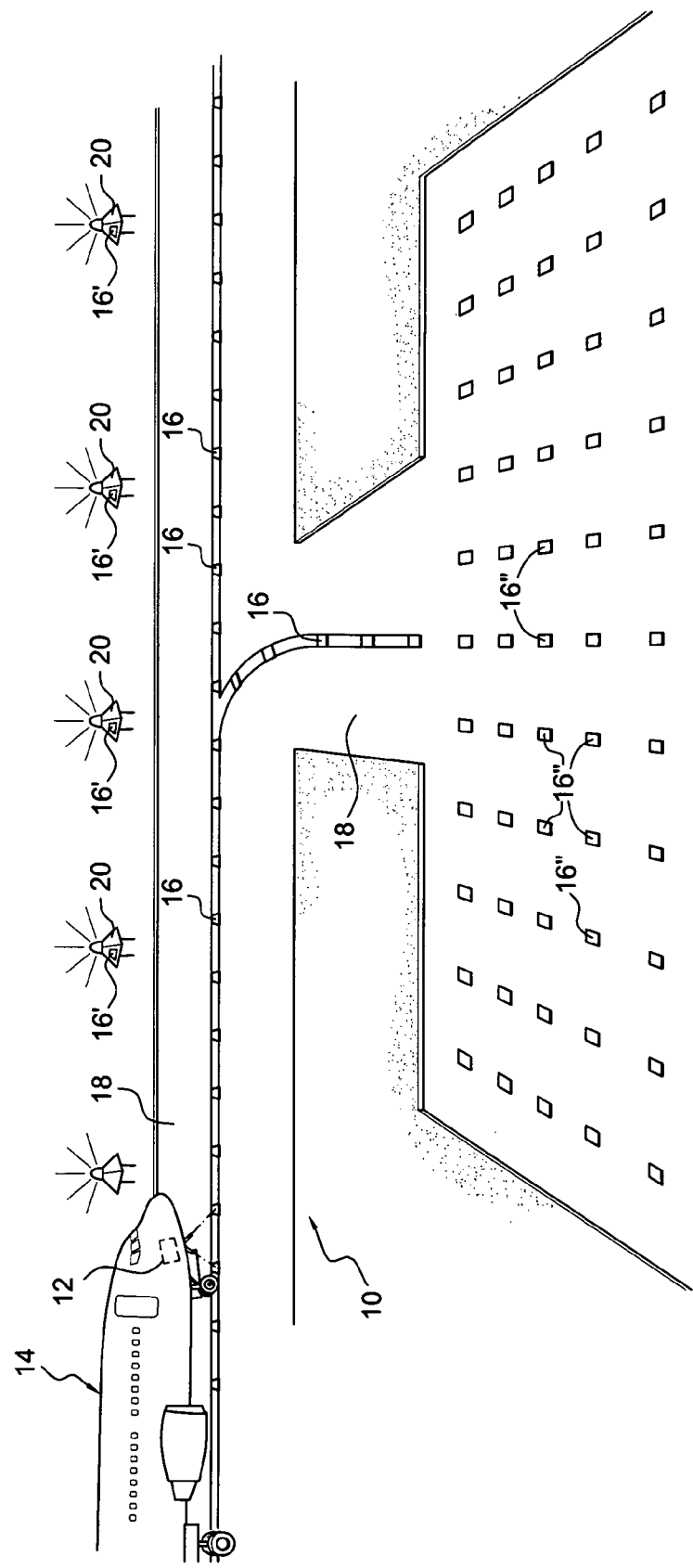
FIG. 1 is a schematic diagram of an airport environment and an aircraft incorporating the principles of the present invention.

Referring now to the drawings and the characters of reference marked thereon, FIG. 1 illustrates a vehicle location determination system, designated generally as 10. The vehicle location determination system 10 includes an RFID interrogator system 12 positioned on a vehicle, in this figure an aircraft 14. A plurality of passive RFID tags are positioned in the aircraft surface movement area. For example, RFID tags 16 may be positioned along the centerlines of the taxiways and runways 18 of an airport. They may be positioned therealong by embedding them in the concrete or lighting fixtures. RFID tags 16' may alternately or additionally be placed within lighting fittings 20 on the sides of these taxiways and runways 18. Furthermore, RFID tags 16" may be placed, for example, on a grid on the surface of the airport parking apron or ramp.

Passive RFID tags are well known in the automatic data identification industry. They typically include an integrated circuit (IC) attached to an antenna—typically a small coil of wires—plus some protective packaging (e.g. a plastic card) as determined by the application requirements. RFID tags can come in many forms and sizes. Data is stored in the IC and transmitted through the antenna to a reader. Such passive RFID tags require no batteries.

Figure 2:
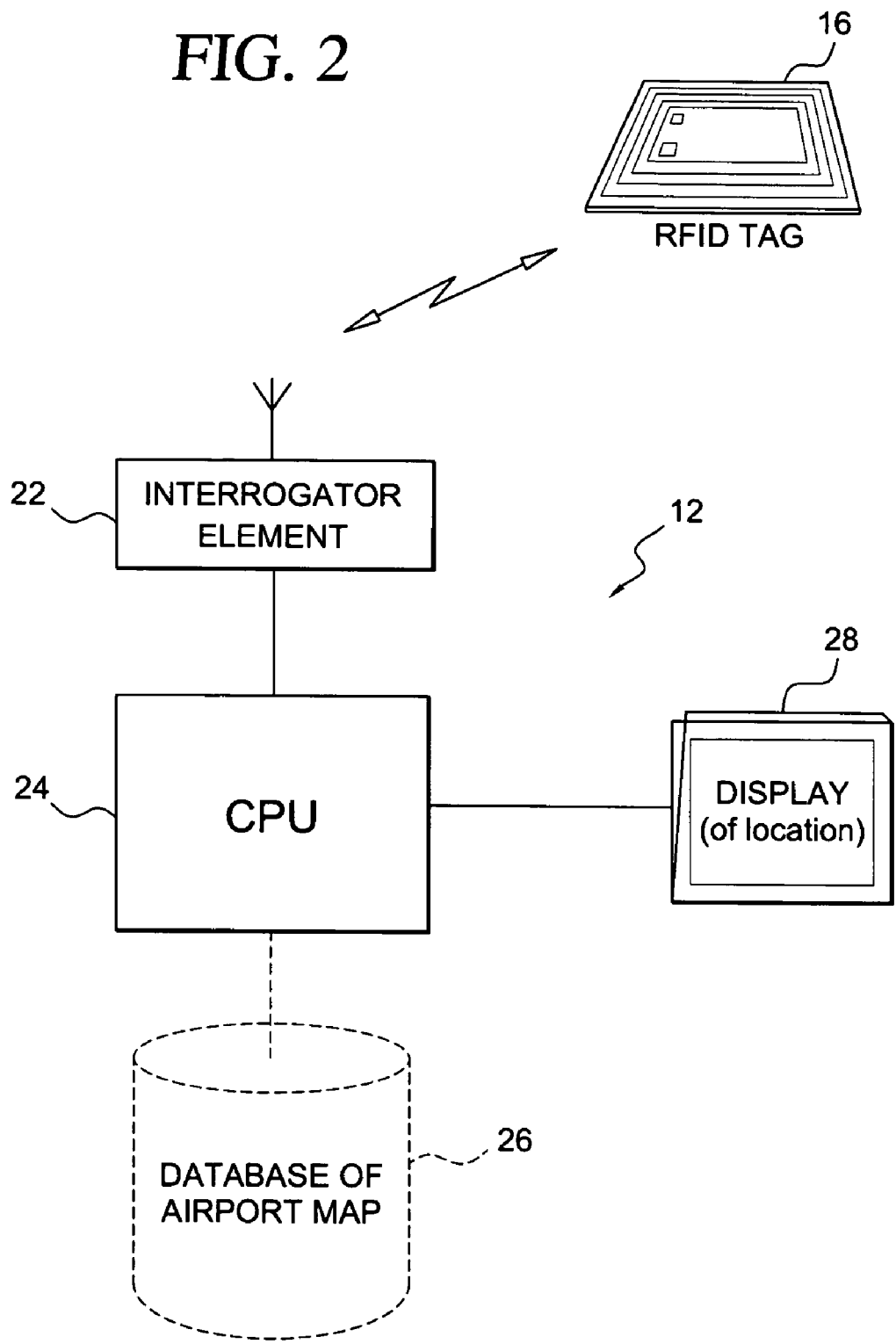
FIG. 2 is a block diagram of the interrogator system of the present invention.

Referring now to FIG. 2, each RFID tag 16, 16', 16" should be positioned in an operable range of a possible intended path of the aircraft. Each interrogation system 12 includes an interrogator element 22 (i.e. receiver or reader) which is necessary to be positioned to interrogate RFID tags 16 at the appropriate time. Interrogator elements 22 are also well known in the automatic data identification industry. The interrogation elements used should support the specific operating modes and frequencies of the RFID tags selected. They include a radio frequency (RF) transmitter and receiver, controlled by a microprocessor or digital signal processor. The interrogator element, using an attached antenna, captures data from tags then passes the data to a computer for processing. As with tags, readers come in a wide range of sizes and offer different features.

The interrogator system 12 includes a computer system 24 operatively connected to the interrogator element 22. The computer system 24 may be, for example, a standalone system or part of the avionics computer system. In a suitable fashion, the computer system 24 may have access to a database 26 of airport map information so that the location of the vehicle in the airport can be determined based on the interrogation of the passive RFID tags 16. The location data from the computer system 24 can be used for displaying the location on a display device 28 operatively connected to the computer system 24.

The computer system 24 manages and organizes the responses from the RFID tags based on algorithms that be developed by those skilled in the art.

Two examples of potential algorithms for managing responses are noted below:

Algorithm 1
1. RFID interrogator is instructed to obtain IDs of proximate RFID tags.
2. Tag IDs contain encoded information, for example, of the taxiway or runway identification and position on that taxiway or runway, which can be decoded without reference to a database.
3. Display shows e.g. "ON TAXIWAY ALPHA" being derived from the decoded information for taxiway Alpha. This can be extended to show "ON TAXIWAY ALPHA APPROACHING INTERSECTION WITH TAXIWAY BRAVO" when the decoded information indicates that the vehicle is indeed approaching that intersection, if enough additional information is encoded into the RFID tags indicating to proximity to the intersection.

Algorithm 2—Alternatively, a database of tag IDs could be used in conjunction with the encoding of Algorithm 1.
1. RFID interrogator is instructed to obtain IDs of proximate RFID tags.
2. Tag IDs are decoded and compared to a database of airport surface locations for the specified airport to determine exactly where on the airport surface the vehicle is located.
3. The display shows a map or perspective view of the airport and the vehicle's position.

The vehicle location determination system may be further extended by permitting the aircraft to report its determined position on the airport surface, for example by broadcasting that information, thereby allowing other aircraft in the vicinity and air traffic control at the airport to know that aircraft's position.

Although application of the vehicle location determination system has been discussed with regard to its specific application to an aircraft in an airport these inventive aspects may have numerous other applications. For example, it may be used on ground vehicles such as fuel tankers, cargo tugs, busses, catering trucks and snow plows.

Other embodiments and configurations may be devised without departing from the spirit of the invention and the scope of the appended claims.

The invention claimed is:

1. A vehicle location determination system, comprising:
 a) a radio frequency identification (RFID) interrogator system positioned on a vehicle; and,
 b) a plurality of passive RFID tags each having a unique tag ID containing encoded information which can be decoded without reference to a database, said RFID tags being positioned in an environment proximate to an intended path of said vehicle,
 wherein said RFID interrogator system provides the capability of determining the location of the vehicle in said proximate environment based on the interrogation of said passive RFID tags.

2. The vehicle location determination system of claim 1, wherein said vehicle comprises an aircraft and said environment comprises an airport surface movement area of an airport, thus providing enhanced situational awareness to pilots as to their position in the airport.

3. The vehicle location determination system of claim 1, wherein said RFID tags are positioned along the centerline of the taxiways and runways of an airport.

4. The vehicle location determination system of claim 1, wherein said RFID tags are embedded within the concrete along the centerline of the taxiways and runways of an airport.

5. The vehicle location determination system of claim 1, wherein said RFID tags are embedded along the centerline of the taxiways and runways of an airport within light fittings thereon.

6. The vehicle location determination system of claim 1, wherein said RFID tags are positioned within runway and taxiway lights of an airport.

7. The vehicle location determination system of claim 1, wherein said RFID tags are embedded along the taxiways and runways of an airport within light fittings thereon.

8. The vehicle location determination system of claim 1, wherein said RFID tags are positioned in a grid on the surface of an airport parking apron or ramp.

9. The vehicle location determination system of claim 1, wherein said RFID interrogator system, comprises:
 a) an interrogator element positionable within operable ranges of a plurality of said RFID tags during operation of the vehicle location system;
 b) a computer system operatively connected to said interrogator element for managing and organizing responses from said RFID tags to provide vehicle location data; and,
 c) a display device operatively connected to said computer system for utilizing said vehicle location data for displaying the vehicle's location.

10. The vehicle location determination system of claim 9, wherein said RFID interrogator system further comprises a database of an airport map.

11. The vehicle location determination system of claim 9, wherein said computer system is integrated into the avionics system of an aircraft.

12. A system for locating the position of an aircraft in an airport surface movement area, comprising:
   a) a radio frequency identification (RFID) interrogator system positioned on an aircraft; and,
   b) a plurality of passive RFID tags positioned in an airport surface movement area of an airport each having a unique tag ID containing encoded information which can be decoded without reference to a database,
   wherein said RFID interrogator system provides the capability of determining the location of said aircraft in said airport surface movement area based on the interrogation of said passive RFID tags, thus providing enhanced situational awareness to pilots as to their position in the airport.

13. The system of claim 12, wherein said RFID tags are positioned along the centerline of the taxiways and runways of the airport.

14. The system of claim 12, wherein said RFID tags are embedded within the concrete along the centerline of the taxiways and runways of the airport.

15. The system of claim 12, wherein said RFID tags are embedded along the centerline of the taxiways and runways of the airport within light fittings thereon.

16. The system of claim 12, wherein said RFID tags are positioned within runway and taxiway lights of the airport.

17. The system of claim 12, wherein said RFID tags are positioned in a grid on the surface of the airport parking apron or ramp.

18. A method for determining the location of a vehicle, comprising the steps of:
   a) positioning a plurality of passive radio frequency identification (RFID) tags in an environment proximate to an intended path of a vehicle each having a unique tag ID containing encoded information which can be decoded without reference to a database;
   b) interrogating said RFID tags via an RFID interrogator system positioned on the vehicle to receive said unique tag IDs; and
   c) determining the location of the vehicle in said environment based on said interrogation.

19. The method of claim 18, wherein said RFID tags are positioned in an airport surface movement area of an airport and said vehicle is an aircraft, thus providing enhanced situational awareness to pilots as to their position in the airport.

20. The method of claim 19, wherein the aircraft broadcasts its position on the airport surface, thus providing other aircraft in the vicinity and air traffic control at the airport with information about its position.

* * * * *